United States Patent
Carlier et al.

(12)

(10) Patent No.: US 6,271,272 B1
(45) Date of Patent: Aug. 7, 2001

(54) EXPANDABLE POLYSTYRENE COMPOSITION, EXPANDED BEADS AND MOULDED PARTS

(75) Inventors: Christophe Carlier; David Douay, both of Lille; Jean-Marc Galewski, Noeux-les-Mines, all of (FR)

(73) Assignee: BP Chemicals Limited, London (GB)

( * ) Notice: Subject to any disclaimer, the term of this patent is extended or adjusted under 35 U.S.C. 154(b) by 0 days.

(21) Appl. No.: 09/338,584

(22) Filed: Jun. 23, 1999

(30) Foreign Application Priority Data

Jun. 29, 1998 (FR) .................................................. 98 08436

(51) Int. Cl.$^7$ ....................................................... C08J 9/20
(52) U.S. Cl. ................. 521/56; 521/57; 521/58; 521/60; 521/98
(58) Field of Search ................... 521/56, 57, 60, 521/98, 58

(56) References Cited

U.S. PATENT DOCUMENTS

| | | | |
|---|---|---|---|
| 3,060,138 | * 10/1962 | Wright | 521/148 |
| 3,398,105 | * 8/1968 | Roper et al. | 521/58 |
| 3,647,723 | * 3/1972 | Mysik et al. | 521/56 |
| 4,243,717 | 1/1981 | Gahmig. | |

FOREIGN PATENT DOCUMENTS 2 110 217 A   6/1983   (GB).

* cited by examiner

*Primary Examiner*—Morton Foelak
(74) *Attorney, Agent, or Firm*—Finnegan, Henderson, Farabow, Garrett, and Dunner, L.L.P.

(57) ABSTRACT

The present invention relates to a homogeneous composition of an expandable styrene polymer in the form of beads comprising (a) 100 parts b.w. of a styrene polymer having a weight-average molecular mass of 150,000 to 300,000 and a residual monomer content of less than 2,000 ppm, (b) from 2 to 9 parts by weight of at least one blowing agent comprising n-pentane, (c) from 0.1 to less than 1.0 part by weight of a petroleum wax comprising a mixture of $C_{18}$ to $C_{80}$ alkanes, and (d) from 0 to 1.0 part by weight of a nucleating agent chosen from synthetic Fisher-Tropsch or polyolefin waxes. The composition allows the step of pre-expanding the beads to be improved by increasing the rate of expansion of the beads and by improving the productivity of the pre-expansion step, without substantially affecting the final molding step.

21 Claims, No Drawings

EXPANDABLE POLYSTYRENE COMPOSITION, EXPANDED BEADS AND MOULDED PARTS

BACKGROUND OF THE INVENTION

The present invention relates to a composition of an expandable styrene polymer in the form of beads, to a process for preparing the composition and to the materials manufactured from the composition, such as expanded beads and moulded parts of expanded polystyrene.

Expanded polystyrene is an example of a low-density, rigid, cellular material whose main uses are for the thermal insulation of buildings and for the packaging of food or industrial products.

The most remarkable properties of expanded polystyrene are its low bulk density, which may range from 7 to 50 kg/m$^3$, its very low thermal conductivity, its good ageing resistance and its good behaviour in water. Its mechanical and thermal properties firstly depend on the bulk density of the material and also on its cellular structure, i.e. on the diameter of the cells, on their distribution and on the corresponding wall thickness.

Expanded polystyrene is especially obtained from polystyrene in which a blowing agent such as pentane has been dissolved this is what is called expandable polystyrene, which is in the form of beads and is the raw material used for moulding parts or articles from expanded polystyrene.

Expandable polystyrene may be obtained either in two steps, comprising polymerization in aqueous suspension of styrene followed by impregnation of the polystyrene by a blowing agent, or in a single step in which the polymerization and impregnation are carried out simultaneously.

The production of expanded polystyrene from beads of expandable polystyrene usually includes three steps:

(a) the beads of expandable polystyrene are firstly expanded by mixing them with steam in a stirred tank: this is the pre-expansion or prefoaming in which the volume of the beads may be increased by a factor of 50 or 60;

(b) the expanded beads are then stored for a few hours in the open air: this step corresponds to stabilization or maturing of the beads;

(c) the beads thus expanded and stabilized are then welded together in moulds by a new heating operation: this is the moulding operation.

Over many years, the properties of expanded polystyrene have been very considerably improved, especially in the moulding step. Thus, it has often been sought to increase the moulding production rate by the choice of additives and of surface treatments of the beads. Products have thus been obtained which weld together well and can be more rapidly demoulded, especially because of a shorter time for cooling the moulded material.

However, little effort has been put in to improving the pre-expansion or prefoaming step, for example in order to increase the production rate of this step, especially by increasing the rate of expansion of the beads. It is precisely during this step that the bulk density of the final material is essentially determined. Thus, any increase in the expansion rate should preferably be achieved while maintaining the uniform development of the beads without affecting their cellular structure (cell sizes and distributions) or their dimensional stability, nor reducing the moulding production rate in the last step.

Moreover, in recent years it has been sought to greatly reduce the residual monomer content in expandable polystyrene. However, the presence of residual monomer may be seen as a factor promoting the rate of expansion of the beads. Thus, greatly reducing the residual monomer content may be regarded as an additional obstacle to improving the pre-expansion or prefoaming, especially to increasing the rate of expansion of the beads.

One of the objects of the present invention is therefore to find a means or an additive allowing the rate of expansion of the beads to be increased during the step of pre-expanding or prefoaming an expandable polystyrene having a low residual monomer content without, however, affecting the cellular structure of the expanded materials or reducing the moulding production rate in the final step.

British Patent Application GB-1,012,277 describes a process for improving the moulding of expanded polystyrene beads, especially for reducing the time for cooling the moulded material. The process consists in treating the beads of an expandable polystyrene using 0.1 to 10% by weight of a wax, essentially by coating. The treatment of the beads can be carried out only before or after the end of the polymerization, that is to say at the earliest at the time when the beads have formed during the suspension polymerization. This may, for example, take place during the final steps of the styrene suspension polymerization process, under conditions such that the wax incorporated into the polystyrene can migrate to the surface of the beads and thus form a coating sufficient to allow more rapid cooling of the moulded material during the final moulding step. The patent application cites a large number of natural or synthetic waxes, having a melting point of 50 to 85° C. for example, and recommends coating the beads using a synthetic wax, more particularly a polyethylene wax having a melting point of approximately 70° C., in an amount of 1 to 2% by weight with respect to the polymer. According to the patent application, in all cases this is a process which is essentially equivalent to a surface treatment of the beads. It is precisely because of this surface treatment effect that the expanded beads may be welded together more rapidly. A treatment limited to the surface could in no case have an appreciable effect on the expansion of the beads during the prior pre-expansion or prefoaming step since the expansion essentially depends on the uniform and homogeneous character of the structure of the beads.

U.S. Pat. No. 3,060,138 discloses the manufacture of beads of expandable polystyrene, using isopentane as the blowing agent. In order to improve control of the size of the cells in the expanded materials, a $C_{16}$ to $C_{46}$ hydrocarbon paraffin is dissolved in isopentane in an amount of 0.5 to 2% by weight with respect to the polystyrene. According to this patent, the use of isopentane is essential for reducing the size of the cells, and it is because of a synergy between the isopentane and this paraffin that it is possible to have an effect on the cellular structure of the expanded material and that, under these conditions, the paraffin thus acts as a nucleating agent. No effect on the rate of expansion of the beads during the pre-expansion or prefoaming step is mentioned.

British Patent Application GB-1,289,466 discloses a process for increasing the rate of moulding of expanded polystyrene, especially for reducing the time for cooling the moulded material. The process consists, after polymerization, in coating beads of expandable polystyrene using an oil or a wax or a mixture of an oil and a wax. The patent application cites many natural or synthetic waxes, and more particularly Example 1 shows a paraffin wax used in an amount of 0.01% by weight with respect to the polymer: this is a crude paraffin wax containing 25% by weight of mineral oil. Coating the beads with this paraffin wax allows the moulding to be improved, especially by allowing the moulded material to be cooled more rapidly. The surface treatment effect produced by the coating can in no way provide a uniform and homogeneous character capable of improving the expansion of the beads and especially of increasing the production rate of the pre-expansion or prefoaming step.

U.S. Pat. No. 4,243,717 discloses a process for increasing the rate of moulding of expanded polystyrene, especially for reducing the time for cooling the moulded material, and simultaneously for controlling the cellular structure of the expanded material. The process consists in adding, during polymerization of the styrene, a synthetic wax called Fischer-Tropsch wax having a congealing point of 86° C. to 110° C. and consequently a melting point greater than these values. This Fischer-Tropsch wax used as a nucleating agent is different from petroleum waxes, which in particular have lower molecular masses.

American Patent U.S. Pat. No. 3,224,984 discloses a process for reducing the size of the cells of expanded polystyrene and simultaneously increasing the moulding rate by more rapid cooling. The process consists in adding, during the polymerization of styrene, a synthetic wax, more specifically a polyolefin wax, for example a polyethylene wax having a density ranging from 0.918 to 0.960, or a polypropylene wax. The polyolefin wax is used as a nucleating agent and generally has a weight-average molecular mass of 1000 to 4000. It is different from petroleum waxes, which in particular have lower molecular masses.

European Patent Application EP-0,409,694 discloses a process for improving the productivity of expanded-polystyrene moulding plants, especially by increasing the moulding rate by more rapid cooling of the moulded materials. The process consists in carrying out a styrene suspension polymerization in the presence of 0.01 to 0.6% by weight (with respect to the monomer) of a synthetic wax chosen from polyethylene waxes having a number-average molecular mass of 500 to 5000, or having a softening point of 90 to 110° C. and consequently a melting point greater than these values, or else a melt flow index (ASTM D 1238 standard, condition E) of greater than 100 dg/min. These polyethylene waxes are different from petroleum waxes which, for example, have lower molecular masses.

U.S. Pat. No. 3,647,723 discloses a process for improving the step of pre-expanding or prefoaming beads of expandable polystyrene, especially by reducing the tendency of the beads to stick to one another. The process consists in adding, during the suspension polymerization of styrene, a wax having a melting point of 70 to 120° C., an acid number of 0 to 45 and a saponification number of 3 to 150. This is a wax essentially consisting of esters of alcohols and of aliphatic acids with a long chain—very different from a petroleum wax. The patent cites in Comparative Example B the use of 0.1% by weight of a paraffin wax having a melting point of 58 to 60° C. The wax is introduced during the polymerization at the moment when the degree of conversion of styrene into polymer is 40%. The composition thus obtained has the drawback of being in the form of beads which stick together and disturb the pre-expansion or prefoaming. No mention is made as regards any possible effect on the rate of expansion of the beads.

British Patent Application GB-2,110,217 discloses a method of making expandable polystyrene beads containing 0.05% to 0.5%, by weight based on the styrene, of a polyethylene wax, which is substantially linear and has a density of at least 15.4 kg/m3, a molecular weight of 700 to 1500, a polydispersity of less than 1.2, and a melting point of at least 102° C. This polyethylene wax is different from petroleum waxes.

SUMMARY OF THE INVENTION

The present invention consists in using a homogeneous composition of an expandable styrene polymer in the form of beads containing a particular petroleum wax comprising a mixture of alkanes in a specific proportion with respect to the polymer. The composition allows the step of pre-expanding or prefoaming the beads of an expandable styrene polymer to be very considerably improved, especially by increasing the rate of expansion of the beads and by improving the productivity of the pre-expansion or prefoaming step.

Advantageously, the cellular structure of the expanded beads and of the moulded materials resulting from the composition is not substantially modified by the presence of this petroleum wax, which therefore does not act as a nucleating agent. Finally, the presence of this petroleum wax in a homogeneous composition such as that of the present invention has no appreciable influence on the final moulding step, the rate of which is neither affected in one way or the other but remains at a very satisfactory level.

The present invention relates more particularly to a homogeneous composition of an expandable styrene polymer in the form of beads, comprising:
(a) 100 parts by weight of a styrene polymer having a weight-average molecular mass, $M_w$, of 150,000 to 300,000 and a residual monomer content of less than 2000 parts par million by weight (ppm);
(b) from 2 to 9 parts by weight of at least one blowing agent comprising n-pentane;
(c) from 0.1 to less than 1.0 part by weight of a petroleum wax comprising a mixture of $C_{18}$ to $C_{80}$ alkanes; and
(d) from 0 to 1.0 part by weight of a nucleating agent chosen from synthetic Fischer-Tropsch or polyolefin waxes.

DETAILED DESCRIPTION OF THE INVENTION

The composition of the invention is called homogeneous in the sense that this especially allows it to be distinguished from the previously known compositions in which additives, such as waxes, were used to produce an essentially surface effect, in particular by coating the beads, and to improve, for example, the moulding operation. The homogeneous nature of the present composition may be characterized by the fact that the petroleum wax is especially distributed through the composition in a substantially uniform manner. In this sense, the composition is especially able to be obtained by a styrene polymerization in aqueous suspension, intended to form the styrene polymer and carried out in the presence of the petroleum wax introduced into the aqueous suspension during the polymerization, especially at the start of polymerization, in particular before the time characterized as being the particle identity point (PIP), that is to say before the moment when the beads are formed with a defined particle size. The petroleum wax may be introduced at the start of polymerization, preferably at a time corresponding to a degree of conversion of the styrene into polymer of 0 to 35%, for example a degree of conversion of 0 to 20%, in particular of 0%, that is to say at the moment when the polymerization starts. The petroleum wax is preferably preblended with the styrene, before the start of the polymerization.

The composition is that understood to be obtained after the polymerization and generally after the postpolymerization or finishing treatments, such as removal of liquid, drying, screening and possibly coating, but before pre-expansion and moulding.

The beads of expandable styrene polymer may have a diameter of 0.2 to 3.0 mm, preferably a weight-average diameter of 0.5 to 2.0 mm. They may furthermore have the advantage of being able to flow freely, especially without sticking to one another.

The main component of the composition is a styrene polymer. This should be understood to mean a homopolystyrene or a styrene copolymer with at least 50% by weight, preferably at least 80% or 90% by weight, of styrene. The comonomer or comonomers used in the copolymer may be alpha-methylstyrene, styrenes halogenated in the ring, styrenes alkylated in the ring, acrylonitrile, acrylic acid or methacrylic acid esters of alcohols having from 1 to 8 carbon atoms, N-vinylcarbazole or maleic acid (anhydride). The styrene polymer may contain a branching agent, incorporated by polymerization, that is to say a compound with more than one, preferably two, carbon-carbon double bonds, in a low proportion, for example from 0.005 to 0.1% by weight with respect to the styrene.

The weight-average molecular mass, $M_w$, of the styrene polymer generally lies between 150,000 and 300,000, preferably between 180,000 and 270,000.

The styrene polymer has a low residual monomer content, generally less than 2000 parts per million (ppm) by weight, preferably less than 1000 ppm, in particular less than 800 ppm or even 600 ppm.

The composition contains from 2 to 9 parts, preferably from 3 to 7 parts, by weight of at least one blowing agent comprising n-pentane. The blowing agent may be a mixture of more than 70% to less than 90% by weight of n-pentane and more than 10% to less than 30% by weight of isopentane. In particular, the mixture may contain from 75 to 85% by weight of n-pentane and from 15 to 25% by weight of isopentane. Too high a proportion of isopentane in the mixture with n-pentane may cause dimensional instability of the cellular structure during pre-expansion or prefoaming.

A preferred composition according to the present invention is a composition having a low content of blowing agent which, in this case, comprises:
from 2 to less than 5 parts by weight of the blowing agent; and
from 0.2 to 0.9 part, preferably from 0.3 to 0.6 part, by weight of the petroleum wax.

Another preferred composition, but one which has a higher content of blowing agent, comprises:
from 5 to 9 parts by weight of the blowing agent; and
from 0.1 to 0.6 part, preferably from 0.1 to less than 0.5 part, in particular from more than 0.1 to 0.45 part by weight of the petroleum wax.

The choice of petroleum wax in the present invention is an important element in obtaining the desired results. The petroleum wax is a natural wax obtained from crude petroleum. The petroleum wax that can be used in the invention can be selected from the paraffin waxes, also known as macrocrystalline waxes, and from the microcrystalline waxes.

Petroleum waxes that can be used for the present invention generally comprise a mixture of $C_{18}$ to $C_{80}$, preferably $C_{20}$ to $C_{70}$ alkanes. For a petroleum wax chosen among paraffin waxes it essentially consists of a mixture of $C_{20}$ to $C_{50}$, for example $C_{20}$ to $C_{48}$, alkanes. For a petroleum wax chosen among microcrytalline waxes it essentially consists of a mixture of $C_{20}$ to $C_{54}$ alkanes.

The distribution of the alkanes in the mixture of a petroleum wax may advantageously be such that the predominant constituent by weight is one or more $C_{24}$ to $C_{40}$, preferably $C_{25}$ to $C_{38}$, alkanes, the weight content of which may in particular be, for each of them, from 2 to 25%, preferably 3 to 20%, by weight of the mixture.

A typical example of a petroleum wax which is suitable in the present invention is that defined by the European Wax Federation (EWF): "Summaries of National Regulations Affecting Wax Usage, Brussels 1991": this is a wax having a distribution in the number of n-alkane carbon atoms of 18 to 45, preferably of 20 to 45, and an iso-alkane and cycloalkane content of 0 to 40% by weight and an n-alkane content of 60 to 100% by weight.

As an illustration a petroleum wax chosen among the paraffin waxes may also be a mixture of 45 to 100% by weight of n-alkanes and of 0 to 55% by weight of iso-alkanes and/or cycloalkanes, more particularly of 50 to 95% by weight of n-alkanes and of 5 to 50% by weight of iso-alkanes and/or cycloalkanes.

In another illustration, the weight content of n-alkanes of the paraffin wax may be from 45 to 85%, or 50 to 75%.

The measurements of the n- and iso-alkane content and the determination of the distribution in the number of carbon atoms of the predominant alkane by weight in the mixture may be carried out by high-temperature gas chromatography, as recommended by the "M-V9" standard methods of "Deutsche Gesellschaft für Fettwissenschaften (DGF)" (see also A. Case, Adhes. Age 33 (1990), 28–31; A. Aduan et al., J. Pet. Res. 6 (1987), 63–76) or by the standard EWF method for analysing hydrocarbon waxes by gas chromatography (according to ASTM D 4626).

A petroleum wax chosen among paraffin waxes may be chosen from semi-refined, refined and de-oiled paraffin waxes. It is preferred to use a paraffin wax which has an oil content (according to the NFT 60-120 or ASTM D 721 standard) of less than or equal to 1.5%, preferably less than or equal to 1.0% and more particularly less than or equal to 0.5% by weight.

A petroleum wax chosen among microcrystalline waxes may be chosen among bright stock slack waxes, plastic microwaxes and hard microwaxes. It is preferred to use a microcrystalline wax which has an oil content (according to the NFT 60-120 or ASTM D 721 standard) of less than 25%, preferably less than or equal to 15% and more particularly less than or equal to 5% by weight.

The petroleum wax may be a mixture of alkanes whose distillation fraction at the boiling point corresponding to 5% by weight distilled mixture contains $C_{25}$ or higher alkanes.

A petroleum wax may be chosen which has dynamic viscosity at 100° C. (according to the NFT 60-100 or ASTM D 445 standard) of 1 to 17 mm²/s, in particular of I to less than 11 mm²/s, preferably of 2 to 9 mm²/s. It is preferred to use a petroleum wax having a dynamic viscosity at 100° C. of 11 to 17 mm²/s, preferably of 11 to 15 mm²/s.

The petroleum wax is generally a solid at ambient temperature (20° C.), but it may advantageously be completely soluble in styrene and n-pentane at this temperature. It may also have a density at 15° C. (according to the NFT 60-101 or ASTM D 1298 standard) of 770 to 915 kg/m³, preferably of 780 to 910 kg/m³. It may furthermore be characterized by a needle penetration at 25° C. (according to the NFT 60-123 or ASTM D 1321 standard) of 10 to 50, preferably of 12 to 45 (1/10 mm).

A petroleum wax chosen among the paraffin waxes may also have a melting point (according to the NFT 60-114 or ASTM D 87 standard) of more than 50 to less than 70° C., particularly of 52 to 68° C. For a petroleum wax chosen among the microcrystalline waxes the melting point may be more than 60 to less than 80° C., particularly more than 62 and less than 78° C.

A petroleum wax chosen among the paraffin waxes may also be characterized by its congealing point (according to the ASTM D 938 standard) which may range from 48 to 68° C., preferably from 50 to 66° C. For a petroleum wax chosen among the microcrystalline waxes the congealing point may range from 58 to 78° C., preferably from 60 to 76° C.

Depending on the circumstances, the petroleum wax may also be characterized by its weight-average molecular mass, $M_w$, which may generally range from 350 to 800, preferably from 350 to 750 or from 400 to 700. In some cases, $M_w$ may range from 350 to less than 500 and, in other cases, from 500 to 800, preferably from 500 to 750 or from 500 to 700. The $M_w$ measurement may be carried out by gel permeation chromatography according to a standard method.

By way of example, it is possible to use a petroleum wax selected from paraffin waxes having the brand name MOBILWAX 130® or 135® or 145® sold by Mobil Oil France or CERA 5860® sold by Repsol France, or PARAFFINE 58/600® sold by Total (France), or OKERIN 5399® or OKERIN 5400® sold by Allied Signal Speciality Chemicals, Astor Limited (England). It is also possible to use a petroleum wax selected from microcrystalline waxes having the brand name MOBILWAX 2360® and MOBILWAX 2370® both sold by Mobil Oil France.

Among paraffin waxes most suitable, mention may be made of a paraffin wax comprising a mixture of $C_{20}$ to $C_{50}$, preferably $C_{20}$ to $C_{48}$, alkanes and having a distribution such that the predominant constituent by weight is one or more $C_{24}$ to $C_{40}$, preferably $C_{24}$ to $C_{36}$, alkanes which may in particular each represent from 5 to 25%, preferably from 8 to 20%, by weight of the mixture. Its oil content is less than or equal to 0.5% by weight. Its dynamic viscosity at 100° C. is from 2 to 9 mm$^2$/s. Its needle penetration at 25° C. is from 10 to 20 (1/10 mm). Its melting point is from 52 to 65° C. and its congealing point is from 50 to 64° C. Its weight-average molecular mass, $M_w$, is from 350 to less than 500.

Another paraffin wax which is very suitable may have the following characteristics: a mixture of $C_{20}$ to $C_{80}$, preferably $C_{20}$ to $C_{70}$, alkanes; the predominant constituent by weight is one or more $C_{24}$ to $C_{40}$, preferably $C_{25}$ to $C_{35}$, alkanes, the weight content for each of which may be especially from 2 to 10%, preferably from 3 to 8%, in the mixture; its oil content is less than 0.5% by weight; its dynamic viscosity at 100° C. is from 11 to 17 mm$^2$/s, preferably from 11 to 15 mm$^2$/s; its needle penetration at 25° C. is from 25 to 50, preferably from 30 to 45 (1/10 mm); its melting point is from 52 to 62° C., preferably from 53 to 60° C.; its congealing point is from 50 to 60° C., preferably from 52 to 59° C.; the distillation fraction at the boiling point corresponding to 5% by weight distilled of the mixture of alkanes contains $C_{25}$ or higher alkanes; its weight-average molecular mass, $M_w$, is from 500 to 800, preferably from 500 to 750, or 500 to 700.

Among microcrystalline waxes most suitable, mention may be made of a microcrystalline wax comprising a mixture of $C_{20}$ to $C_{54}$, preferably $C_{28}$ to $C_{54}$, alkanes. Its oil content is less than or equal to 5% by weight, preferably between 3 to 4% by weight. Its dynamic viscosity at 100° C. is from 11 to 17 mm$^2$/s, preferably from 11 to 15 mm$^2$/s. Its needle penetration at 25° C. is from 26 to 55 (1/10 mm). Its melting point is from 60 to 80° C. and its congealing point is from 58 to 78° C. Its weight-average molecular mass, $M_w$, is from 500 to less than 800, preferably from 500 to 750 or 700.

Preferably, the petroleum wax is used in the form of beads, of granules or of a powder, for example a micronized powder, in particular for the purpose of improving its dispersion at the time when it is used, particularly in the aqueous polymerization suspension, especially right from the start of the styrene polymerization.

The petroleum wax is used in the composition of the present invention in a proportion (per 100 parts by weight of the styrene polymer) ranging from 0.1 to less than 1.0 part, preferably from 0.1 to 0.8 part, more particularly from more than 0.1 to 0.6 part by weight. Too low a proportion does not increase the rate of expansion of the beads significantly. Too high a proportion, especially 1.0 part by weight or more, has the drawback of disturbing the moulding step, in which there is an increase in the time for the moulded material to cool and consequently a drop in the productivity of moulding plants.

The composition also comprises from 0 to 1.0 part, preferably from 0.05 to 0.5 or from 0.1 to 0.5 part by weight of a nucleating agent. The latter is generally used to control the size and the distribution of the cells in the expanded polystyrene. It is preferably distributed substantially uniformly in the composition. It is thus generally incorporated into the expandable polystyrene during the suspension polymerization of the styrene, preferably at a time corresponding to a degree of conversion of the styrene into polymer of 0 to 90%, preferably of 0 to 50%, for example, at the start of polymerization. The nucleating agent is a synthetic wax chosen from Fischer-Tropsch waxes and polyolefin waxes, for example a polyethylene wax or a polypropylene wax. The synthetic waxes may have a weight-average molecular mass greater than 600 and less than 10,000, preferably from 800 to 6000, in particular from 800 to 4000, which may in particular be greater than the weight-average molecular mass of the petroleum wax. The synthetic waxes used may have, for example, a congealing point of 90 to 1 10C, preferably of 95 to 105° C. They generally have a melting point greater than that of the petroleum wax used in the present invention.

The composition may also contain, as additive, a flame retardant or fireproofing agent, in a proportion ranging from 0.05 to 2 parts, preferably from 0.1 to 1.5 parts, by weight (per 100 parts by weight of the styrene polymer). The flame retardant or fireproofing agent is often chosen from brominated compounds such as hexabromocyclohexane, pentabromomonochlorocyclohexane, hexabromocyclododecane, octa-nona- and decabromodiphenil ether.

According to another aspect, the present invention relates to a pre-expansion or prefoaming process making it possible to increase the rate of expansion of beads of a composition of an expandable styrene polymer, the said composition being prepared beforehand in a styrene polymerization in aqueous suspension and comprising (a) 100 parts by weight of the styrene polymer having a weight-average molecular mass, $M_w$, of 150,000 to 300,000 and a residual monomer content of less than 2000 ppm and (b) from 2 to 9 parts by weight of at least one blowing agent comprising n-pentane, which process is characterized in that uniformly distributed in the composition are (c) from 0.1 to less than 1.0 part, preferably from 0.1 to 0.8 part, by weight of a petroleum wax comprising a mixture of $C_{18}$ to $C_{80}$ alkanes, the predominant constituent by weight of which is preferably one or more $C_{24}$ to $C_{40}$ alkanes, the weight content of which may especially be, for each of them, from 2 to 25%, and (d) from 0 to 1.0 part by weight of a nucleating agent chosen from synthetic Fischer-Tropsch or polyolefin waxes, and in that the homogeneous composition thus produced is mixed and heated with steam in one or more passes through a stirred tank so as to manufacture expanded beads having a bulk density of, for example, 7 to 50 kg/m³.

The substantially homogeneous distribution of the petroleum wax in the composition is preferably achieved by introducing the wax during the polymerization of the styrene in aqueous suspension, especially at the beginning of the polymerization, i.e. in the first stage of the polymerization, in particular at a time before the PIP or at a time corresponding to a degree of conversion of the styrene into polymer of 0 to 35%, preferably of 0 to 20% and more particularly of 0%, that is to say at the moment when the polymerization just starts. The petroleum wax is preferably premixed with the styrene, before the start of polymerization.

The constituents of the composition, and especially the petroleum wax and optionally the nucleating agents which are used in the pre-expansion or prefoaming process, may have the aforementioned characteristics. The nucleating agent may be introduced advantageously during the styrene polymerization, in particular as mentioned above.

The pre-expansion or prefoaming process may be carried out as a batch process: the composition may be introduced, for example, from the top of the stirred tank and removed after the operation from the bottom of the tank. Preferably, this process is carried out as a continuous process in a stirred tank, also called a pre-expander, comprising a vertical or oblique cylindrical tank containing the composition to be expanded and the expanded beads in the form of a bed of particles. The process especially comprises the continuous introduction of steam and of the composition at the bottom of the tank, the steam escaping via the top of the tank and the expanded beads being drawn off by virtue of an overflow via the top of the bed.

Generally, the composition mixed with steam is heated to a temperature corresponding to the softening temperature of the expandable styrene polymer, that is to say at a temperature generally between 80 and 110° C., preferably between 85 and 100° C.

The bead-expansion kinetics show that the bulk density of the expanded beads generally passes through a minimum and that, beyond this minimum, a collapse of the cellular structure of the bead occurs, resulting from the blowing agent escaping. The heating of the beads is generally stopped before this minimum is reached. In a continuous process, the average residence time of the beads is generally calculated in such a way that this minimum is not reached. The bulk density of the expanded beads is generally regulated by varying the rate of introduction of the composition into the stirred tank, varying the pressure of the steam introduced and by optionally adding air mixed with the steam.

It is thus possible to obtain, in a short time, expanded beads having a bulk density of 7 to 50 kg/m³ in one or more passes through the pre-expansion or prefoaming plant. Next, the expanded beads are generally cooled and dried, for example in a bed fluidized by air. They are then subjected to the stabilization or maturing step for several hours, for example from 5 to 48 h, in silos, before they go on to the final moulding step. In the latter step, it is found that the presence of the petroleum wax as used in the composition has no appreciable influence on the moulding rate and, in particular, on the rate of cooling of the moulded materials, which remains unaltered and very satisfactory.

According to another aspect, the present invention thus relates to a process for preparing the composition described above.

More particularly, the preparation process comprises a polymerization in aqueous suspension by bringing 100 parts by weight of styrene and optionally at least one other monomer (comonomer) into contact with at least one compound of the styrene-soluble peroxy type, by way of an initiator. The process is characterized in that the polymerization (1) is carried out at a temperature of 80 to 120° C. in the presence of (i) from 0.1 to less than 1.0 parts by weight of the petroleum wax introduced into the aqueous suspension at a time corresponding to a degree of conversion of the styrene into polymer of 0 to 35%, (ii) from 3 to 10 parts by weight of the blowing agent introduced into the aqueous suspension at a time corresponding to a degree of conversion of the styrene into polymer of 0 to 95% and (iii) from 0 to 1.0 part by weight of the nucleating agent introduced into the aqueous suspension at a time corresponding to a degree of conversion of the styrene into polymer of 0 to 90% and the polymerization (2) is continued at a temperature greater than 1 20° C. and less than 1 50° C. for a time sufficient to reach a residual monomer content of less than 2000 ppm.

The (co)monomers optionally employed in the polymerization are those mentioned above.

The polymerization is carried out by bringing the monomer or monomers into contact with an initiator, preferably at least two initiators, particularly peroxides such as dibenzoyl, dicumyl or di-tert-butylperoxides, peresters such as tert-butyl perbenzoate, perketals such as 2,2-bis(tert-butylperoxy)butane or 1,1-bis(tert-butylperoxy) cyclohexane, or else monoperoxy carbonates such as 2-ethylhexyl tert-butylperoxycarbonate, 2-ethylhexyl tert-amylperoxycarbonate, isopropyl tert-amylperoxycarbonate or stearyl tert-butylperoxycarbonate. The total amount of initiator used may range from 0.1 to 1 part by weight per 100 parts by weight of monomer.

The petroleum wax, the blowing agent and optionally the nucleating agent used in the process for preparing the composition are those mentioned above. They are introduced into the polymerization medium under preferred conditions such as those already mentioned above. In particular, the blowing agent may be introduced into the aqueous suspension in its entirety or in several fractions during the polymerization, for example one fraction at the start of the polymerization and the rest during the polymerization, but preferably before reaching a degree of conversion of the styrene into polymer of 95% or of 90%.

The respective amounts of blowing agent and of petroleum wax to be introduced into the aqueous suspension may vary depending on whether it is desired to have a composition having a low content of blowing agent. Thus, in this case, the amounts introduced are, (per 100 parts by weight of monomer):

from 3 to less than 6.5 parts by weight of the blowing agent; and from 0.2 to 0.9 part, preferably from 0.3 to 0.6 part, by weight of the petroleum wax.

If it is desired to have a composition having a higher content of blowing agent, the amounts introduced are in this case:

from 6.5 to 10.5 parts by weight of the blowing agent; and from 0.1 to 0.6 part, preferably from 0.1 to less than 0.5 part, in particular from more than 0.1 to 0.45 part, by weight of the petroleum wax.

The styrene polymerization is preferably carried out at, at least, two temperature levels, a first level ranging from 80 to 120° C. and a second level above 120° C., for example 125° C., but below 150° C. The polymerization time, especially for the second level, is such that the polymerization is stopped when a residual monomer content of less than 2000 ppm, preferably less than 1000 ppm and more particularly less than 800 ppm or even less than 600 ppm, is reached.

The styrene polymerization may be carried out in the presence of a nucleating agent and/or of a fireproofing agent, such as those mentioned previously, and under preferred conditions, that are also mentioned previously.

Other additives, such as at least a chain-transfer agent, for example a mercaptan or the dimer of alpha-methylstyrene, a branching or crosslinking agent, for example a polymerizable monomer containing at least two carbon-carbon double bonds, such as divinylbenzene, and a suspension stabilizer, may also be used during polymerization of the styrene. As suspension agent, it is possible to use water-soluble high-molecular-weight compounds, such as polyvinyl alcohols, hydroxyethyl cellulose, methyl cellulose, polyacrylamides and polyvinyl pyrrolidones, or barely water-soluble inorganic substances, such as tricalcium phosphate, magnesium pyrophosphate, magnesium oxide and barium phosphate.

After polymerization, the composition thus obtained in the form of expandable beads is generally washed with water, centrifuged, dried in a stream of air (at a temperature of 25 to 55° C., for example) and then screened. The bulk density of the composition is generally about 600 to 700 kg/m$^3$ before pre-expansion or prefoaming.

The present invention also relates to the materials which are obtained from the composition of the present invention and which can be obtained by the pre-expansion or pre-foaming process described above. In particular, these are expanded beads obtained from the composition of the present invention which contains, per 100 parts by weight of the styrene polymer, (i) from 0.5 to 6 parts by weight of the blowing agent, (ii) from 0.1 to less than 1.0, preferably from 0.1 to 0.8 and more particularly from more than 0.1 to 0.6 part by weight, of the petroleum wax mentioned above and distributed in a substantially uniform manner in the beads and (iii) from 0 to 1.0 part by weight of the nucleating agent mentioned above.

Before moulding, the expanded beads generally have a bulk density of 7 to 50 kg/m$^3$.

The materials obtained from the composition of the present invention, and especially from the expanded beads mentioned above, may be expanded moulded parts of any geometrical shape and of any volume.

The following examples have the purpose of illustrating the present invention in a non-limiting manner. In all the examples, the parts mentioned are parts by weight.

An advantage of the present invention is the possibility to select petroleum waxes with specifications in accordance with food regulations. In particular petroleum waxes are selected with the following specifications:

Content of mineral hydrocarbons with carbon number less than 25: not more than 5% (w/w):

Dynamic viscosity not less than 11 mm$^2$/s at 100° C. (ASTM D 445);

Weight-average molecular mass not less than 500.

EXAMPLE 1

The following are introduced into a reactor provided with stirring, heating and cooling means:

96.2 parts of water;

2 parts of an aqueous solution containing 2.7% by weight of polyvinyl alcohol;

100 parts of styrene;

0.03 part of dibenzoyl peroxide;

0.27 part of tert-butyl perbenzoate;

0.18 part of dicumyl peroxide;

0.68 part of hexabromocyclododecane; and 3.5 parts of a 75/25 mixture by weight of n-pentane and isopentane, so as to obtain a reaction mixture at a temperature of 85° C. and so as to polymerize the styrene.

Various tests are carried out in this example, in the absence (Comparative Test A) or in the presence (Tests B, C and D according to the invention) of a petroleum wax in a respective amount of 0.1, 0.2 and 0.3 part, introduced as a preblend with the styrene, before introducing the styrene into the reactor. The petroleum wax used in these tests comes from a natural petroleum wax, which is a refined paraffin wax sold by Repsol Derivados S.A. (Spain) under the reference CERA 58-60®. It consists of a mixture of $C_{20}$ to $C_{50}$ alkanes, the predominant constituent by weight of which is a $C_{24}$ to $C_{36}$ alkane in a proportion by weight of 3 to 10% in the mixture. The melting point of the wax (according to the NFT 60-114 standard) is 59° C. The wax is characterized by an oil content (according to the NFT 60-120 standard) of less than or equal to 0.5% by weight, and by a needle penetration at 25° C. (according to the NFT 60-123 standard) of 14 to 19 (1/10 mm). The wax has a density (according to the NFT 60-101 standard) of 790 kg/m$^3$.

The reaction mixture produced above at 85° C. is then heated to 110° C., held at this temperature for 2 hours and again heated to 125° C. When the degree of conversion of the styrene into polymer reaches 50%, 3.5 parts of the abovementioned mixture of n-pentane and isopentane are then introduced into the reactor. The polymerization is continued at 125° C. until a residual styrene content of 750 ppm is reached. The polymerization is stopped at this point by cooling the reactor to ambient temperature. The beads of expandable polystyrene are thus obtained, after having also carried out the usual liquid-removal, drying and screening operations.

The beads appear in the form of particles that do not stick to one another and that have a homogeneous composition as shown in Table 1.

Next, the beads are subjected to the pre-expansion operation by heating and mixing them with steam in a tank. For each of the compositions prepared in Tests A to D, the decrease in the bulk density of the beads over time is measured under conditions which are, moreover, identical and the value of this bulk density after heating for 90 seconds is given in Table 1. It may be seen that the beads resulting from the compositions of Tests B, C and D according to the invention have a lower bulk density than that of the beads resulting from the composition of Test A (comparative test) that does not contain petroleum wax. Thus, it may be seen that the presence of the petroleum wax makes it possible to increase the rate of expansion of the beads and, consequently, to reduce the heating time by approximately 50% in order to achieve the same bulk density (for example, 13 kg/m$^3$).

Next, the beads thus expanded are subjected to a stabilizing operation and then to a moulding operation, under identical conditions. It is observed that the moulding rate is not modified, either in one direction or in the other, when the compositions of Tests A, B, C and D are used, and especially that the cooling rate of the moulded materials is identical in all cases.

TABLE 1

Compositions produced according to Tests A (comparative test), B, C and D and bulk density of the beads resulting after pre-expanding them for 90 seconds.

| Test | Parts by weight of the petroleum wax in the composition | $M_w$ of the polystyrene | Parts by weight of n-pentane and isopentane in the composition | Bulk density of the beads after pre-expanding them for 90 seconds (kg/m³) |
|---|---|---|---|---|
| A (Comparative test) | 0 | 186,000 | 6.25 | 16.3 |
| B | 0.1 | 189,000 | 6.11 | 15.6 |
| C | 0.2 | 187,000 | 6.25 | 14.5 |
| D | 0.3 | 185,000 | 6.28 | 13.3 |

EXAMPLE 2

Exactly the same procedure as in Example 1 is followed except that, in order to prepare the compositions, 2.5 parts instead of 3.5 parts of the mixture of n-pentane and isopentane are introduced into the reactor, both at the time of preparing the reaction mixture at 85° C. and during the polymerization at the time corresponding to a degree of conversion of the styrene into polymer of 50%.

Moreover, tests are carried out in this example in the absence (Comparative Test E) or in the presence (Tests F, G and H according to the invention) of the same wax as that used in Example 1, but in a respective amount of 0.3, 0.5 and 0.6 part introduced as a preblend with the styrene, before introducing the styrene into the reactor.

The beads of expandable polystyrene are thus obtained in each of the tests E to H and are in the form of particles that do not stick to one another and that have a homogeneous composition such as that shown in Table 2.

As in Example 1, the pre-expansion operation is carried out with these various compositions and the value of the bulk density of the expanded beads after heating them for 90 seconds is given in Table 2. It may be seen that the beads resulting from the compositions of Tests F, G and H according to the invention have a lower bulk density than that of the beads resulting from the composition of Comparative Test E. The presence of a petroleum wax in the compositions according to the invention therefore makes it possible to reduce the heating time by approximately 50% in order to achieve the same bulk density (for example, 13 kg/m³).

Next, the beads thus expanded are subjected to the stabilizing and moulding operations under identical conditions. It is observed that the moulding rate, and especially the cooling rate of the moulded materials are not modified between compositions E, F, G and H and that, consequently, the presence of the petroleum wax has no influence on the moulding operation.

TABLE 2

Compositions produced according to Tests E (comparative test), F, G and H and bulk density of the resulting beads after pre-expanding them for 90 seconds.

| Test | Parts by weight of the petroleum wax in the composition | $M_w$ of the polystyrene | Parts by weight of n-pentane and isopentane in the composition | Bulk density of the beads after pre-expanding them for 90 seconds (kg/m³) |
|---|---|---|---|---|
| E (Comparative test) | 0 | 190,000 | 4.5 | 26 |
| F | 0.3 | 190,000 | 4.4 | 25 |
| G | 0.5 | 197,000 | 4.6 | 22 |
| H | 0.6 | 200,000 | 4.6 | 22 |

EXAMPLE 3

The following are introduced into a reactor provided with stirring, heating and cooling means:

96.2 parts of water;

2 parts of an aqueous solution containing 2.7% by weight of polyvinyl alcohol;

100 parts of styrene;

0.13 part of dibenzoyl peroxide;

0.3 part of tert-butyl perbenzoate;

0.15 part of a synthetic polyethylene wax having a weight-average molecular mass, Mw, of 1000; and 2.6 parts of a 75/25 mixture by weight of n-pentane and isopentane, so as to obtain a reaction mixture at a temperature of 85° C. and to polymerize the styrene.

Various tests are carried out in this example in the absence (Comparative Test K) or in the presence (Test L according to the invention) of a petroleum wax in an amount of 0.5 part, introduced as a preblend with the styrene, before introducing the styrene into the reactor. The petroleum wax used in Test L is identical to that in Example 1.

The reaction mixture produced above at 85° C. is then heated to 110° C., held at this temperature for 2 hours and again heated to 140° C. When the degree of conversion of the styrene into polymer reaches 70%, 2.6 parts of the abovementioned mixture of n-pentane and isopentane are then introduced into the reactor. The polymerization is continued at 140° C. until a residual styrene content of 300 ppm is reached. The polymerization is stopped at this point by cooling the reactor to ambient temperature. The beads of expandable polystyrene are thus obtained, after having also carried out the usual liquid-removal, drying and screening operations.

The beads appear in the form of particles that do not stick to one another and that have a homogeneous composition as shown in Table 3.

Next, the beads are subjected to the pre-expansion operation by heating and mixing them with steam in a tank. For each of the compositions prepared in Tests K and L, the decrease in the bulk density of the beads over time is measured under conditions which are, moreover identical and the value of this bulk density after heating for 90 seconds is given in Table 3. It may be seen that the beads resulting from the composition of Test L according to the invention have a lower bulk density than that of the composition of Test K (comparative test) that does not contain petroleum wax. Thus, it may be seen that the presence of the petroleum wax makes it possible to increase the rate of expansion of the beads and, consequently, to reduce the heating time by approximately 50% in order to achieve the same bulk density (for example, 22 kg/m$^3$).

Next, the beads thus expanded are subjected to the stabilizing and moulding operations under identical conditions. It is observed that the moulding rate and, especially, the cooling rate of the moulded materials are not modified when compositions K and L are used and that, consequently, the presence of the petroleum wax in no way affects the moulding operation.

present example is a refined petroleum wax which is a paraffin wax sold by Allied Signal Speciality Chemicals, Astor Limited (England) under the reference OKERIN 5400. It consists of a mixture of $C_{20}$ to $C_{66}$ alkanes, the predominant constituent by weight of which is a $C_{31}$ alkane and a $C_{32}$ alkane, in a proportion by weight for each of them of approximately 5% in the mixture. The congealing point of the wax (according to the ASTM D 938 standard) is 57° C. It has a dynamic viscosity at 100° C. (according to the ASTM D 445 standard) of 12.2 mm$^2$/s and is, moreover, characterized by a needle penetration at 25° C. (according to the ASTM D 3021 standard) of 36 (1/10 mm).

A Test N is carried out under exactly the same conditions as Test M of Example 4, except for the fact that the wax mentioned above is used. In Test N, results similar to Test M are obtained with regard to the bulk density of the beads obtained and to the final moulding operation, which is not affected by this wax.

EXAMPLE 6

The following are introduced into a reactor provided with stirring, heating and cooling means:
  100 parts of water;
  100 parts of styrene;
  0.21 part of 2-ethylhexyl tert-butylperoxycarbonate;
  0.2 part of dibenzoyl peroxide;
  0.125 part of alpha-methylstyrene dimer;
  0.37 part of usual suspension agents;

TABLE 3

Compositions produced according to Tests K (comparative test) and L and bulk density of the resulting beads after pre-expanding them for 90 seconds.

| Test | Parts by weight of the petroleum wax in the composition | $M_w$ of the polystyrene | Parts by weight of n-pentane and isopentane in the composition | Bulk density of the beads after pre-expanding them for 90 seconds (kg/m$^3$) |
|---|---|---|---|---|
| K (Comparative test) | 0 | 222,000 | 4.8 | 25.3 |
| L | 0.5 | 221,000 | 4.7 | 22.8 |

EXAMPLE 4

Exactly the same procedure as in Example 3 is followed except that the wax used is different. The wax used in the present example is a refined petroleum wax which is a paraffin wax sold by Allied Signal Speciality Chemicals, Astor Limited (England) under the reference OKERIN 5399. It consists of a mixture of $C_{20}$ to $C_{66}$ alkanes, the predominant constituent by weight of which is a $C_{27}$ alkane, in a proportion by weight of 3.5% in the mixture. The congealing point of the wax (according to the ASTM D 938 standard) is 54° C. It has a dynamic viscosity at 100° C. (according to the ASTM D 445 standard) of 13.3 mm$^2$/s and is, moreover, characterized by a needle penetration at 25° C. (according to the ASTM D 1321 standard) of 40 (1/10 mm).

A Test M is carried out under exactly the same conditions as Test L of Example 3, except for the fact that the wax mentioned above is used. In Test M, results similar to Test L are obtained with regard to the bulk density of the beads obtained and to the final moulding operation, which is not affected by this wax.

EXAMPLE 5

Exactly the same procedure as in Example 4 is followed, except that the wax used is different. The wax used in the 0.5 part of Mobilwax 2360® (Test P) or Mobilwax 370® (Test Q)
  0.1 part of a synthetic polyethylene wax having a weight-average molecular mass, Mw, of 1000;
so as to obtain a reaction mixture at a temperature of 85° C. and to polymerize the styrene.

Various tests are carried out in this example in the presence of a petroleum wax selected among Mobilwax 2360® (Test P according to the invention)and Mobilwax 2370® (Test Q according to the invention)in an amount of 0.5 part, introduced as a preblend with the styrene, before introducing the styrene into the reactor. Mobilwax 2360® and 2370® are microcrystalline waxes consisting of mixtures essentially of $C_{20}$ to $C_{54}$ alkanes, comprising 70% by weight of n-alkanes and 30% by weight of isoalkanes. They have a melting point (according to the ASTM D 127 standard) of 78° C. Mobilwax 2360® has a dynamic viscosity at 100° C. (according to the ASTM D 445 standard) of 14 mm$^2$/s, a needle penetration at 25° C. (according to the ASTM D 1321 standard) of 26 (1/10 mm), an oil content (according to the ASTM D 721 standard) of 3% by weight and a density at 15° C. (according to the ASTM D 1298 standard) of 848 kg/m3. Mobilwax 2370® has a dynamic viscosity at 100° C. (according to the ASTM D 445 standard) of 15 mm²/s, a needle penetration at 25° C. (according to the ASTM D 1321 standard) of 55 (1/10 mm), an oil content (according to the ASTM D 721 standard) of 4% by weight and a density at 15° C. (according to the ASTM D 1298 standard) of 860 kg/m³.

The reaction mixture produced above at 85° C. is then heated to 110° C., held at this temperature for 2 hours and again heated to 140° C. After 3h 50 min and before 5 h 35 min of polymerization reaction, 5.275 parts of a 75/25 mixture by weight of n-pentane and isopentane are then introduced continuously into the reactor. The polymerization is continued at 140° C. until a residual styrene content of 500 ppm is reached. The polymerization is stopped at this point by cooling the reactor to ambient temperature. The beads of expandable polystyrene are thus obtained, after having also carried out the usual liquid-removal, drying and screening operations.

The beads appear in the form of particles that do not stick to one another and that have a homogeneous composition as shown in Table 4.

Next, the beads are subjected to the pre-expansion operation by heating and mixing them with steam in a tank. For each of the compositions prepared in Tests P and Q, the decrease in the bulk density of the beads over time is measured under conditions which are, moreover identical and the value of this bulk density after heating for 90 seconds is given in Table 4. It may be seen that the beads resulting from the composition of Test P and Test Q according to the present invention have low bulk densities. Thus, it may be seen that the presence of the microcrystalline wax makes it possible to increase the rate of expansion of the beads and, consequently, to reduce the heating time by approximately 50% in order to achieve the same bulk density.

the petroleum wax, the petroleum wax being introduced into the aqueous suspension at a time when the conversion of the styrene into styrene polymer is from 0 to 35%.

2. Composition according to claim 1, wherein the petroleum wax is selected from the group consisting of paraffin waxes and microcrystalline waxes.

3. Composition according to claim 1 wherein the styrene polymer has a residual monomer content of less than 1000 ppm, preferably less than 800 ppm.

4. Composition according to claim 1, wherein the blowing agent is a mixture of more than 70% to less than 90% by weight of n-pentane and of more than 10% to less than 30% by weight of isopentane.

5. Composition according to any one of claims 1 to 4 wherein the composition, comprises:

from 2 to less than 5 parts by weight of the blowing agent; and from 0.2 to 0.9 part by weight of the petroleum wax.

6. Composition according to claim 1, wherein the petroleum wax comprises a mixture of $C_{20}$ to $C_{70}$ alkanes.

7. Composition according to claim 1, wherein the petroleum wax comprises a mixture of alkanes, the predominant constituent by weight of which is one or more $C_{24}$ to $C_{40}$ alkanes.

8. Composition according to claim 7, the weight content of the predominant alkane(s) in the mixture is, for each of them, from 2 to 25%.

9. Composition according to claim 1, wherein the petroleum wax is introduced into the aqueous suspension before a the characterized as being the particle identity point.

10. Composition according to claim 1, wherein the petroleum wax is introduced into the aqueous suspension at the time when the polymerization just starts.

11. Composition according to claim 10, wherein the petroleum wax is preblended with the styrene.

TABLE 4

Compositions produced according to Tests P and Q and bulk density of the resulting beads after pre-expanding them for 90 seconds.

| Test | Parts by weight of the petroleum wax in the composition | $M_w$ of the polystyrene | Parts by weight of n-pentane and isopentane in the composition | Bulk density of the beads after pre-expanding them for 90 seconds (kg/m³) |
|---|---|---|---|---|
| P | 0.5 | 205,000 | 4.2 | 22.8 |
| Q | 0.5 | 205,000 | 4.2 | 24.1 |

What is claimed is:

1. A homogeneous composition of an expandable styrene polymer in the form of beads, comprising:
   (a) 100 parts by weight of a styrene polymer having a weight-average molecular mass, $M_w$, of 150,000 to 300,000 and a residual monomer content of less than 2000 ppm;
   (b) from 2 to 9 parts by weight of at least one blowing agent comprising n-pentane;
   (c) from 0.1 to less than 1.0 parts by weight of a petroleum wax comprising a mixture of $C_{18}$ to $C_{80}$ alkanes; and
   (d) from 0 to 1.0 part by weight of a nucleating agent chosen from synthetic Fischer-Tropsch or polyolefin waxes, wherein the petroleum wax is distributed substantially uniformly throughout the composition, said composition being prepared in part by polymerizing styrene in an aqueous suspension to obtain the styrene polymer in the presence of 12. Composition according to claim 1, wherein the composition comprises from 0.05 to 0.5 part by weight of the nucleating agent.

13. A pre-expansion process making it possible to increase the rate of expansion of beads of a homogeneous composition of an expandable styrene polymer comprising (a) 100 parts by weight of a styrene polymer having a weight-average molecular mass, $M_w$, of 150,000 to 300,000 and a residual monomer content of less than 2000 ppm, (b) from 2 to 9 parts by weight of at least one blowing agent comprising n-pentane, (c) from 0.1 to less than 1.0 part by weight of a petroleum wax comprising a mixture of $C_{18}$ to $C_{80}$ alkanes and (d) from 0 to 1.0 part by weight of a nucleating agent chosen from synthetic Fischer-Tropsch or polyolefin waxes, said homogeneous composition being prepared in part by polymerizing styrene in an aqueous suspension to obtain the styrene polymer in the presence of the petroleum wax, the petroleum wax being introduced into the aqueous suspension at a time when the conversion of the styrene into styrene polymer is from 0 to 35%, whereby the petroleum wax is distributed uniformly throughout the composition, the process comprising the step of mixing and heating the homogeneous composition with steam in one or more passes through a stirred tank.

14. Process according to claim 13, wherein the petroleum wax is introduced into the aqueous suspension just at the start of the polymerization of the styrene in the aqueous suspension.

15. Process for preparing the composition according to claim 1, comprising polymerizing in aqueous suspension 100 parts by weight of styrene and optionally at least one other monomer with at least one styrene-soluble peroxy compound, by way of an initiator, wherein the polymerization (1) is carried out at a temperature of 80 to 120° C. in the presence of (i) from 0.1 to 1.0 part by weight of the petroleum wax introduced into the aqueous suspension at a time corresponding to a degree of conversion of the styrene into polymer of 0 to 35%, (ii) from 3 to 10 parts by weight of the blowing agent introduced into the aqueous suspension at a time corresponding to a degree of conversion of the styrene into polymer of 0 to 95% and (iii) from 0 to 1.0 parts by weight of the nucleating agent introduced into the aqueous suspension at a time corresponding to a degree of conversion of the styrene into polymer of 0 to 90% and (2) is continued at a temperature greater than 120° C. and less than 150° C. for a time sufficient to achieve a residual monomer content of less than 2000 ppm.

16. Process according to claim 15, wherein the petroleum wax is preblended with the styrene before the start of the polymerization.

17. Expanded beads obtained from the composition according to claim 1 comprising, per 100 parts by weight of the styrene polymer, (i) from 0.5 to 6 part by weight of the blowing agent, (ii) from 0.1 to less than 1.0 part by weight of the petroleum wax distributed in a substantially uniform manner in the beads and (iii) from 0 to 1.0 part by weight of the nucleating agent.

18. Expanded moulded parts obtained from the composition according to claim 1.

19. Expanded moulded parts obtained from the expanded beads according to claim 17.

20. Composition of claim 3, wherein the styrene polymer has a residual monomer content of less than 800 ppm.

21. Composition according to any one of claims 1 to 4 wherein the composition comprises:

from 5 to 9 parts by weight of the blowing agent; and
from 0.1 to 0.6 part by weight of the petroleum wax.

* * * * *

UNITED STATES PATENT AND TRADEMARK OFFICE
CERTIFICATE OF CORRECTION

PATENT NO.   : 6,271,272 B1  Page 1 of 1
DATED        : August 7, 2000
INVENTOR(S)  : Christophe Carlier et al.

It is certified that error appears in the above-identified patent and that said Letters Patent is hereby corrected as shown below:

Column 18,
Line 9, ",preferably less than 800 ppm" should be deleted.

Signed and Sealed this

Tenth Day of September, 2002

Attest:

Attesting Officer

JAMES E. ROGAN
Director of the United States Patent and Trademark Office